(12) United States Patent
Elhami

(10) Patent No.: US 12,516,843 B2
(45) Date of Patent: Jan. 6, 2026

(54) HEAT TRANSFER SYSTEM FOR FACILITATING TRANSFER OF HEAT TO AIR AND WATER WITH ONE HEAT PUMP

(71) Applicant: Armanch inc., Toronto (CA)

(72) Inventor: Arman Elhami, Toronto (CA)

(73) Assignee: Armanch inc. (CA)

( * ) Notice: Subject to any disclaimer, the term of this patent is extended or adjusted under 35 U.S.C. 154(b) by 123 days.

(21) Appl. No.: 18/242,613

(22) Filed: Sep. 6, 2023

(65) Prior Publication Data

US 2023/0408133 A1    Dec. 21, 2023

(51) Int. Cl.
*F24F 11/84* (2018.01)
*F24F 1/26* (2011.01)

(52) U.S. Cl.
CPC .............. *F24F 11/84* (2018.01); *F24F 1/26* (2013.01)

(58) Field of Classification Search
CPC .................................. F24F 11/84; F24F 11/26
See application file for complete search history.

(56) References Cited

U.S. PATENT DOCUMENTS

2008/0098760 A1    5/2008  Seefeldt
2011/0126559 A1    6/2011  Kopko et al.

*Primary Examiner* — Nael N Babaa
(74) *Attorney, Agent, or Firm* — Dhiraj Jindal; PATENT YOGI LLC

(57) ABSTRACT

Disclosed herein is a heat transfer system for the transfer of heat to air and water using a heat pump. Further, the heat transfer system may include an outdoor unit comprising a compressor having a compressor inlet and a compressor outlet, a refrigerant switchover valve fluidly coupled to the compressor configured to change the direction of the flow of the fluid, an outdoor heat exchanger configured to facilitate the transfer of the heat between the fluid and an outdoor environment, a storage tank for storing water having a secondary heat exchanger or a brazed plate heat exchanger configured to facilitate the heating of the water stored in the storage tank, a hydronic heating system having a hydronic heat exchanger and a hydronic pump, and an indoor unit comprising an indoor heat exchanger configured to facilitate the transfer of the heat between the fluid and an indoor environment.

16 Claims, 11 Drawing Sheets

HEAT TRANSFER SYSTEM FOR FACILITATING TRANSFER OF HEAT TO AIR AND WATER WITH ONE HEAT PUMP

CROSS-REFERENCE TO RELATED APPLICATION

This application is a continuation-in-part patent application claiming the benefit of PCT Patent Application No. PCT/IB2021/051890, titled "Heat Transfer System for Facilitating Transfer of Heat to Air and Water with One Heat Pump", filed 6 Mar. 2021, which is incorporated by reference herein in its entirety.

A. Technical Field

The invention disclosed herein generally relates to a heat transfer system. More particularly, the present invention relates to a heat transfer system for facilitating the transfer of heat from air to air, air to water, or air to air and water with a single heat pump, wherein the heat pump is multi-functional that could be used for air heating, air cooling, and also domestic hot water (DHW) and hydronic hot water systems.

B. Description of Related Art

Heat pump systems have been demonstrated as an efficient means of delivering heating and cooling for the purpose of space conditioning for all types of residential, commercial and public buildings. For example, the heat pump system for heat production comprises an integrated hot water heater, an immersion heater, a circulation pump, and a climate system in the indoor unit. The heat is fetched from outside through an outdoor unit where the refrigerant that circulates in a closed piping system, transferring the heat from the source to the indoor unit. The criteria by which heat is transferred could be simplified as, the outdoor unit takes heat from the ambient air and transfer it to a coolant. The compressor increases the temperature of the coolant and then it transfers the heat to a hot water reserve tank via a heat exchanger. Hot water is circulated to radiators via faucets and cold water is transported back to the tank. Further, the coolant is transferred from the tank to the outdoor unit.

By reversing the process above, the refrigerant in the outdoor unit would take the heat from the water and release it in the outside environment, thus the heat pump could cool the household if necessary.

Few existing patent references attempted to address the aforementioned problems are cited in the background as prior art over the presently disclosed subject matter and are explained as follows:

A prior art US20080098760 assigned to Seefeldt; William J, describes about a heat pump system with compressors and multiple heat exchangers to provide forced air heating, radiant heating and/or water heating for an interior space. A conduit system connecting the primary compressor and the heat exchangers whereas the conduit system circulating a refrigerant through the primary compressor. The system includes an indoor thermostat that monitors the temperature of the indoor air space. The components of the system are System Control, Heat Pump Manager (HPM), standby heat, utility load management, outdoor unit, water heater, relays, blower, and compressors. The outdoor unit includes an evaporator, fan and temperature monitor. The Relays include buffer tank pump, water heater pump, the auxiliary heat and water heater. A booster compressor and a reversible valve are connected to the conduit system which circulating the refrigerant through the booster compressor and reversible valve. A hydronic circuits is provided with an independent pumps or zone valves. The sensors in the system can shut off electrical power to one or both of the compressors under certain conditions.

Another prior art US20110126559 assigned to Kopko; William L, describes about a vapor compression system which includes a vessel in a fluid communication with a compressor and a heat exchanger. The system includes an outdoor unit located outside of a residence and an indoor unit located inside residence whereas the outdoor unit is provided with a fan that draws air across coils to exchange heat with refrigerant in coils before the refrigerant enters residence through lines. A compressor is located at the outdoor unit. The indoor unit with the heat exchanger provides cooling or heating to residence depending on the operation of vapor compression system. The vapor compression system with a blower and air ducts used to distribute the conditioned air (either heated or cooled) through residence. A thermostat is used to control and operate the vapor compression system. The fluid communication includes a solenoid valve that is located between the heat exchanger and an expansion valve, and controls refrigerant flow through gas line. The inlet and outlet of the heat exchanger is connected with the liquid line.

Although the existing heat pump systems are used in most of the countries, they generally do not perform very well in different climate changes to provide forced air heating, radiant heating, and/or water heating for an interior space that utilizes multiple compressors and multiple heat exchangers. Further, the heat pump systems may not be cost-effective for all heating needs. In addition, a gas heating system could be installed as a backup to overcome this issue.

The existing techniques for facilitating the transfer of heat to air and water are deficient with regard to several aspects. For instance, current technologies do not allow the simultaneous exchange of heat between air to air and air to water. Furthermore, current technologies do not provide a heat pump that facilitates heating of water with higher efficiency than a furnace. Moreover, current technologies do not optimize the transfer of heat to air and water based on weather forecasts, electricity prices, hot water usage, and customers' needs.

Therefore, there is a need for a heat transfer system for facilitating the transfer of heat from air to air, air to water, or air to air and water with a single heat pump, wherein the heat pump is multi-functional that could be used for air heating, air cooling, and also domestic hot water (DHW) and hydronic hot water systems. Further, there is also a need for a heat pump system with the combination and integration of an air handler heat pump and a hybrid electric heat pump water heater with or without a hydronic system for providing a new heating/cooling/hot-water thermodynamic cycle that uses air-to-air and air-to-water (air source) with one heat pump.

SUMMARY OF THE INNOVATION

The present invention discloses a heat transfer system for facilitating the transfer of heat to air and water using a heat pump. In one embodiment, the heat transfer system with the heat pump is further configured to initiate sequences of a new heating/cooling/hot-water thermodynamic cycle by means of a smart control system. In one embodiment, the system comprises outdoor unit includes a compressor having a compressor inlet and a compressor outlet, wherein the compressor is configured to pump a refrigerant from the compressor inlet to the compressor outlet. In one embodiment, a refrigerant switchover valve fluidly coupled to the compressor configured to change the direction of the flow of the fluid, wherein the refrigerant switchover valve has an inlet duct and one or more outlet ducts including a first outlet duct, second outlet duct, and a third outlet duct. In one embodiment, the inlet duct is fluidly connected to the compressor outlet configured to facilitate the flow of the fluid from the compressor outlet to the inlet duct and the first outlet duct is connected to the compressor inlet configured to facilitate the flow of the fluid from the first outlet duct to the compressor inlet.

In one embodiment, an outdoor heat exchanger or a refrigerant to air heat exchanger fluidly coupled to the refrigerant switchover valve (or changeover valve) via the second outlet duct configured to facilitate the transfer of the heat between the fluid and an outdoor environment associated with the condenser, wherein the outdoor heat exchanger has an outdoor inlet and an outdoor outlet. In one embodiment, the outdoor inlet is fluidly connected to the second outlet duct configured to facilitate one of the fluid flow from the outdoor inlet to the second outlet duct and the fluid flow from the second outlet duct to the outdoor inlet. In one embodiment, the outdoor heat exchanger and the indoor heat exchanger could be a refrigerant to air heat exchanger.

In one embodiment, a storage tank for storing water. Further, the storage tank comprises a secondary heat exchanger or a brazed plate heat exchanger configured to facilitate the heating of the water stored in the storage tank, wherein the secondary heat exchanger comprises a secondary inlet and a secondary outlet. In one embodiment, the secondary inlet is fluidly coupled to the outdoor outlet of the outdoor heat exchanger via an outdoor duct, wherein the secondary inlet is configured to facilitate at least one of the fluid flow from the outdoor outlet to the secondary inlet and the fluid flow from the secondary inlet to the outdoor outlet. In one embodiment, the secondary outlet is fluidly coupled to the third outlet duct of the refrigerant switchover valve via a secondary duct.

In one embodiment, the heat transfer system further comprises a hydronic heating system. In one embodiment, the hydronic heating system comprises a hydronic heat exchanger and a hydronic pump, wherein the hydronic heat exchanger is disposed of in the storage tank, wherein the hydronic heat exchanger is configured to facilitate the transfer of the heat between the hydronic fluid and the water stored in the storage tank, wherein the hydronic pump is configured to circulate a hydronic fluid (water) between the hydronic heat exchanger and an external heat exchanger. In one embodiment, the hydronic heat exchanger is one of a water to water heat exchanger and a glycol to water heat exchanger.

In one embodiment, an indoor unit includes an indoor heat exchanger or a refrigerant to air heat exchanger configured to facilitate the transfer of the heat between the fluid and an indoor environment, wherein the indoor heat exchanger comprises an indoor inlet and an indoor outlet, wherein the indoor inlet is fluidly coupled to the outdoor outlet of the outdoor heat exchanger and the secondary inlet of the secondary heat exchanger via a first indoor duct, wherein the indoor inlet is configured to facilitate the at least one of the fluid flow from the indoor inlet to the outdoor outlet and secondary inlet, and the fluid flow from the outdoor outlet and secondary inlet to the indoor inlet. In one embodiment, the indoor outlet is fluidly coupled to the third outlet duct of the refrigerant switchover valve (or changeover valve) and the secondary outlet of the secondary heat exchanger via a second indoor duct, wherein the indoor outlet is configured to facilitate at least one of the fluid flow from the indoor outlet to the third outlet duct and secondary outlet and the fluid flow from the third outlet duct and secondary outlet to the indoor outlet.

In one embodiment, the compressor is configured to pump a low-pressure refrigerant to a high-pressure side of the heat transfer system, thereby transforming the low-pressure refrigerant into a high-pressure refrigerant. In one embodiment, the outdoor heat exchanger and the indoor heat exchanger function as a condenser and an evaporator. In one embodiment, the condenser is configured to condense the refrigerant to release the heat of the refrigerant into the surrounding air and condensing the refrigerant into a liquid. In one embodiment, the evaporator is configured to vaporize the refrigerant to raise the temperature of the refrigerant to absorb the heat from the surrounding air.

In one embodiment, the heat transfer system further comprises an auxiliary heating element disposed proximal to the indoor unit configured to facilitate the heating of the indoor environment. In one embodiment, the heat transfer system further comprises one or more regular one direction thermostatic expansion valves (TXV) fluidly coupled with the outdoor outlet of the outdoor heat exchanger, the indoor inlet of the indoor heat exchanger, and the secondary inlet of the secondary heat exchanger. Further, the regular one direction thermostatic expansion valve is configured to facilitate the fluid flow in the outdoor duct and the first indoor duct. In one embodiment, the heat transfer system further comprises one or more solenoid valves configured to shut-off or release of a refrigerant flow in the heat transfer system to manage the fluid flow. In one embodiment, the refrigerant is any of, but not limited to, R410, R744, R404a, and R407C. Further, in some embodiments, the heat transfer system may include a liquid receiver disposed on the outdoor duct between the regular one direction thermostatic expansion valve and the secondary inlet of the secondary heat exchanger. Further, the liquid receiver may be configured for receiving the fluid from the outdoor duct and transmitting the fluid to the secondary inlet, Further, in some embodiments, the heat transfer system may include a water circulation pump disposed proximal to the secondary outlet on the third outlet duct. Further, the water circulation pump is configured for circulating the fluid through the third outlet duct.

In one embodiment, the heat transfer system further comprises one or more blower fan including an outdoor blower fan and an indoor blower fan, wherein the outdoor blower fan is configured to facilitate the transfer of the heat between the fluid in the outdoor heat exchanger and the outdoor environment and an indoor blower fan, wherein the indoor blower fan is configured to facilitate the transfer of the heat between the fluid in the indoor and the indoor environment. In one embodiment, the heat transfer system further comprises one or more temperature sensor and pressure sensor, a processing device, a communication device, and a storage device. In one embodiment, the heat transfer system utilizes one or more heating and cooling cycle configured to facilitate the transfer of heat of the fluid flowing to air and water using the heat pump.

In one embodiment, the heat transfer system further comprises a centralized computer-implemented system or a smart control system for facilitating the management of the heat transfer system, wherein the centralized computer-implemented system comprises one or more temperature sensor configured to generate a temperature data comprising a temperature of the water stored in the storage tank, a temperature of the outdoor environment, and a temperature of the indoor environment; a computing device having at least one processing unit in communication with the one or more temperature sensor and pressure sensor, and a system memory including an operating system, one or more programming modules, and a program data, wherein the at least one processing unit is configured to perform various data processing tasks; a communication device configured to communicate with one or more external devices, thereby performing transmitting and receiving of information in an electric form, and a storage device configured to perform at least one of data storage and data retrieval operations, thereby providing reliable storage of digital information. In one embodiment, the various data processing tasks comprises analyzing, identifying, determining, generating, transforming, calculating, computing, compressing, decompressing, encrypting, decrypting, scrambling, splitting, merging, interpolating, extrapolating, redacting, anonymizing, encoding and decoding. In one embodiment, the one or more external devices are a client device, a third-party database, a public database, and a private database over communication channels. In one embodiment, the heat transfer system further comprises one or more electrically operable components, wherein the one or more electrically operable components comprises security systems, lighting systems, and information systems.

Other objects, features and advantages of the present innovation will become apparent from the following detailed description. It should be understood, however, that the detailed description and the specific examples, while indicating specific embodiments of the innovation, are given by way of illustration only, since various changes and modifications within the spirit and scope of the innovation will become apparent to those skilled in the art from this detailed description.

BRIEF DESCRIPTION OF DRAWINGS

The foregoing summary, as well as the following detailed description of the innovation, is better understood when read in conjunction with the appended drawings. For the purpose of illustrating the innovation, exemplary constructions of the innovation are shown in the drawings. However, the innovation is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present innovation will now be given with reference to the Figures. It is expected that the present innovation may be embodied in other specific forms without departing from its spirit or essential characteristics. The described embodiments are to be considered in all respects only as illustrative and not restrictive.

Figure 1:
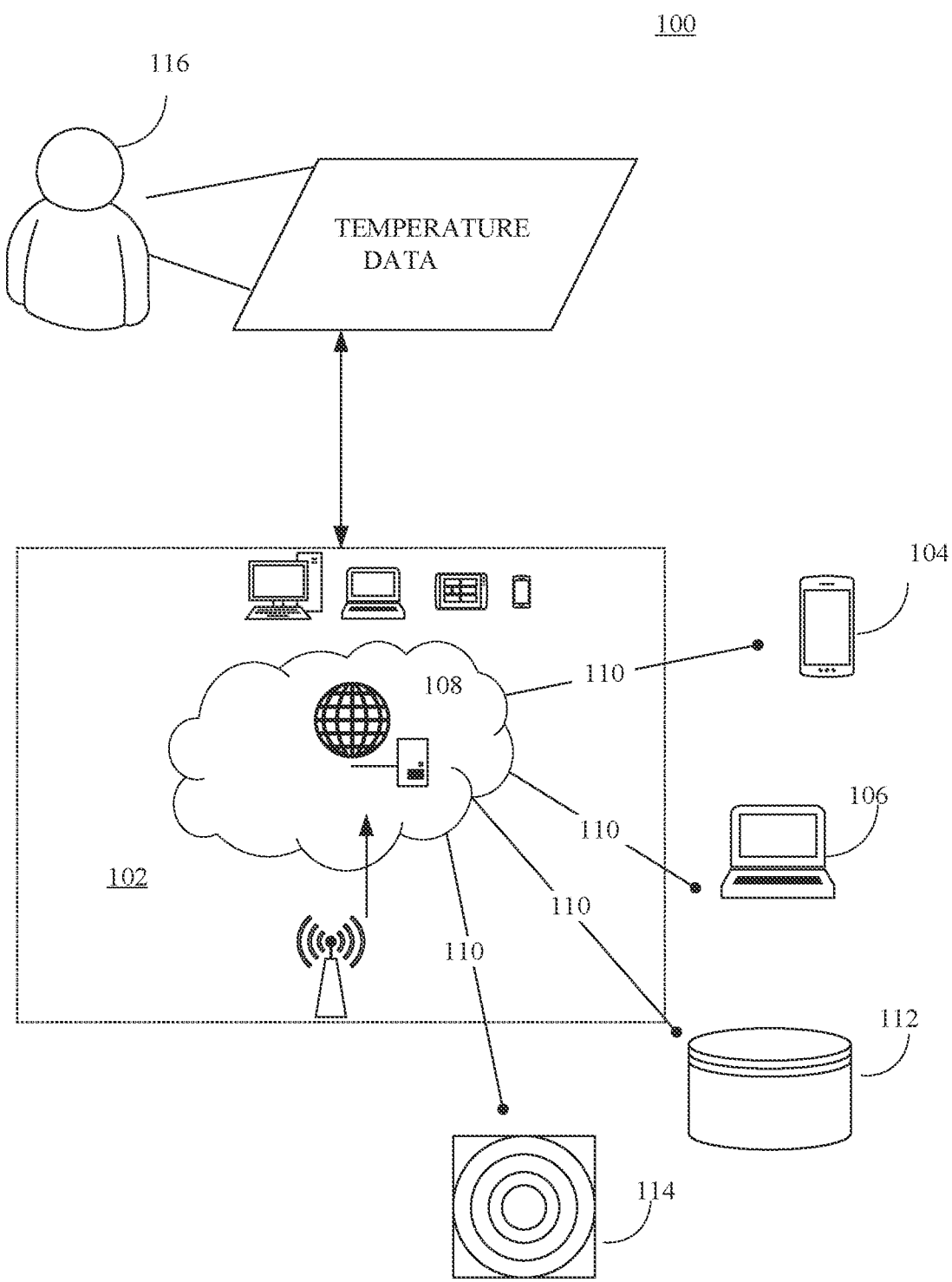
FIG. 1 exemplarily illustrates an environment of an online platform for a heat transfer system consistent with various embodiments of the present invention.

Referring to FIG. 1, an environment of an online platform 100 for a heat transfer system 120 (shown in FIG. 3) consistent with various embodiments of the present invention is disclosed. In one embodiment, the online platform 100 is configured to facilitate the management of the heat transfer system 120 for facilitating the transfer of heat to air and water with at least one heat pump, which could be hosted on a centralized server 108. In one embodiment, the online platform 100 comprises a computing device 102 having a processor or processing unit 115 and a memory 103 having a software module executed by the processor, wherein the software module is at least one of a plug-in component, a web-based software application, and/or a browser extension. In one embodiment, the processor 115 is in communication with a centralized server 108 via a network 110 and configured to perform and transfer heat to air and water with at least one heat pump. In one embodiment, a database 112 in communication with the server 108 is configured to store data related to the heat transfer system 120 and temperature and electricity price data. In one embodiment, the database 112 comprises one or more program modules, which are executed by the processor of the computing device 102.

In one embodiment, the centralized server 108 could communicate with other network entities or user devices (104 and 106) such as, but not limited to, a smart phone, a mobile device, a laptop, a tablet computer, etc. and other electronic devices such as, but not limited to, desktop computers, server computers, etc., databases 112, and sensors 114, for example, temperature sensors and pressure sensor over a communication network 110 such as, but not limited to, the internet or a wireless communication. Further, the user could enable to include relevant parties such as, but not limited to, end-users and administrators. Accordingly, in some embodiments, electronic devices could be operated by one or more relevant parties via the online platform 100.

In one embodiment, a user 116, such as one or more relevant parties could access the online platform 100 through the web-based software application or browser. In one embodiment, the web-based software application could be embodied as, but not limited to, a website, a web application, a desktop application, and a mobile application compatible with the computing device 102.

Figure 2:
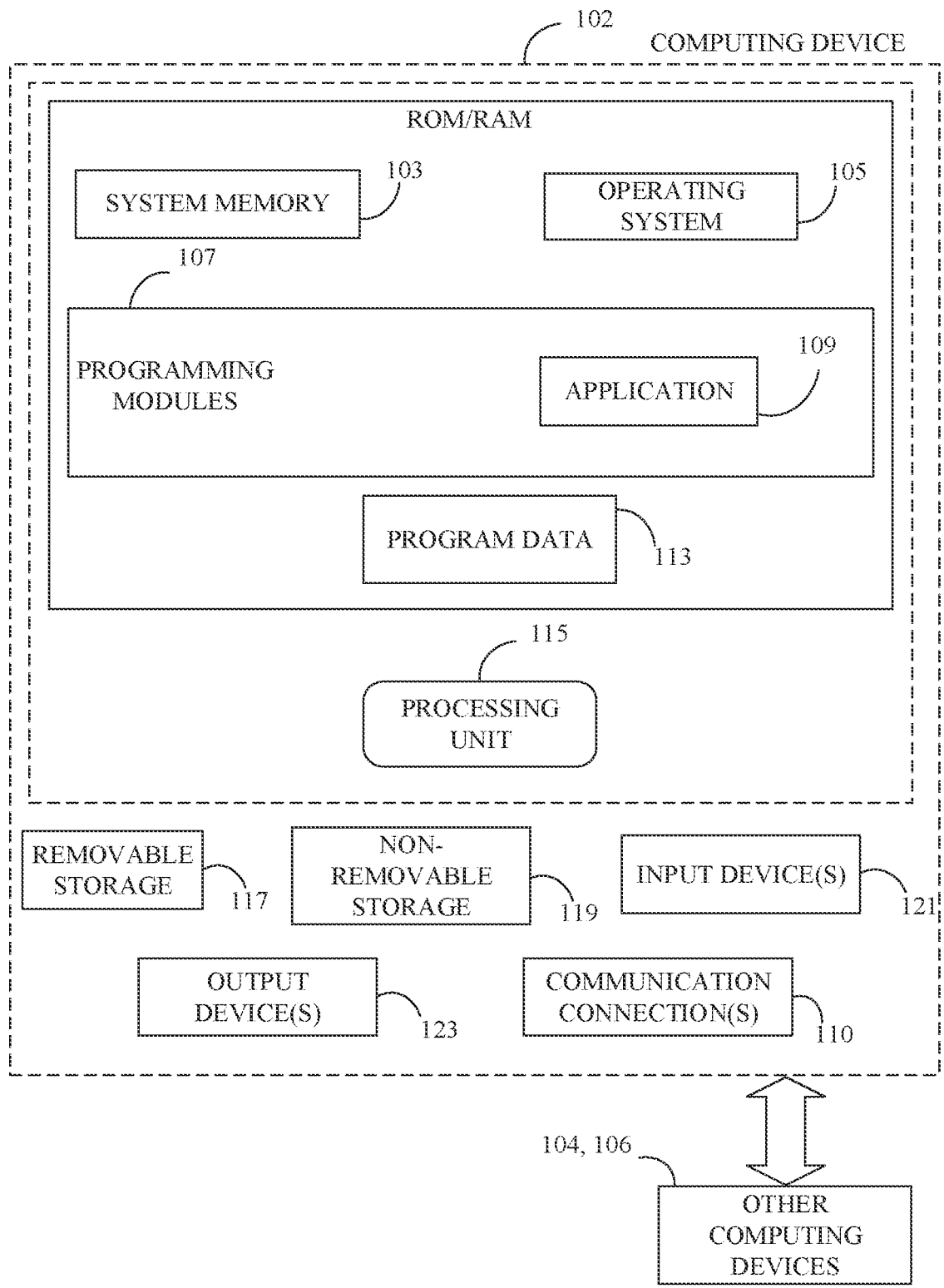
FIG. 2 exemplarily illustrates a block diagram of the computing device or a cloud service for the heat transfer system according to an embodiment of the present invention.

Referring to FIG. 2, a block diagram of the computing device 102 or a cloud service in one embodiment is disclosed. In one embodiment, the computing device 102 comprises a processor or processing unit 115 and a system memory 103. In one embodiment, the system memory 103 comprises, but is not limited to, volatile (e.g., random-access memory (RAM)), non-volatile (e.g., read-only memory (ROM)), flash memory, or any combination based on the configuration and type of the computing device.

In one embodiment, the system memory 103 comprises an operating system 105, one or more programming modules 107, and a program data 113. In one embodiment, the operating system 105 is configured to control the operation of the computing device 102. Furthermore, embodiments of the disclosure may be practiced in conjunction with a graphics library, other operating systems, or any other application program and is not limited to any particular application or system. In one embodiment, the computing device 102 further comprises additional features or functionalities. In one embodiment, the computing device 102 further comprises additional data storage devices such as, but not limited to, such as, for example, magnetic disks, optical disks, or tape. In one embodiment, the computing device 102 further comprises a removable storage 117 and a non-removable storage 119. In some embodiments, the computing device 102 includes volatile and nonvolatile, removable and non-removable media implemented in any method or technology for storage of information, such as computer-readable instructions, data structures, program modules, or other data. In one embodiment, the system memory 103, removable storage 117, and non-removable storage 119 are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 102. In one embodiment, the computing device 102 further comprises input device(s) 121 such as, but not limited to, a keyboard, a mouse, a pen, a sound input device, a touch input device, a location sensor, a camera, a biometric sensor, etc. and output devices 123 such as, but not limited to, a display, speakers, a printer, etc.

In one embodiment, the computing device 102 further comprises a communication connection 110 that may allow to communicate with other computing devices (104 and 106), such as over a network in a distributed computing environment, for example, an intranet or the Internet. In one embodiment, the communication connection 110 could be a communication media, which is typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 103, including an operating system or a smart control system 105. While executing on processing unit 115, programming modules 107 (e.g., application 109 such as a media player) could perform processes including, for example, one or more stages of methods, algorithms, systems, applications, servers, databases as described above. The aforementioned process is an example, and processing unit 115 could perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

In one embodiment, the computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may, in fact, be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3:
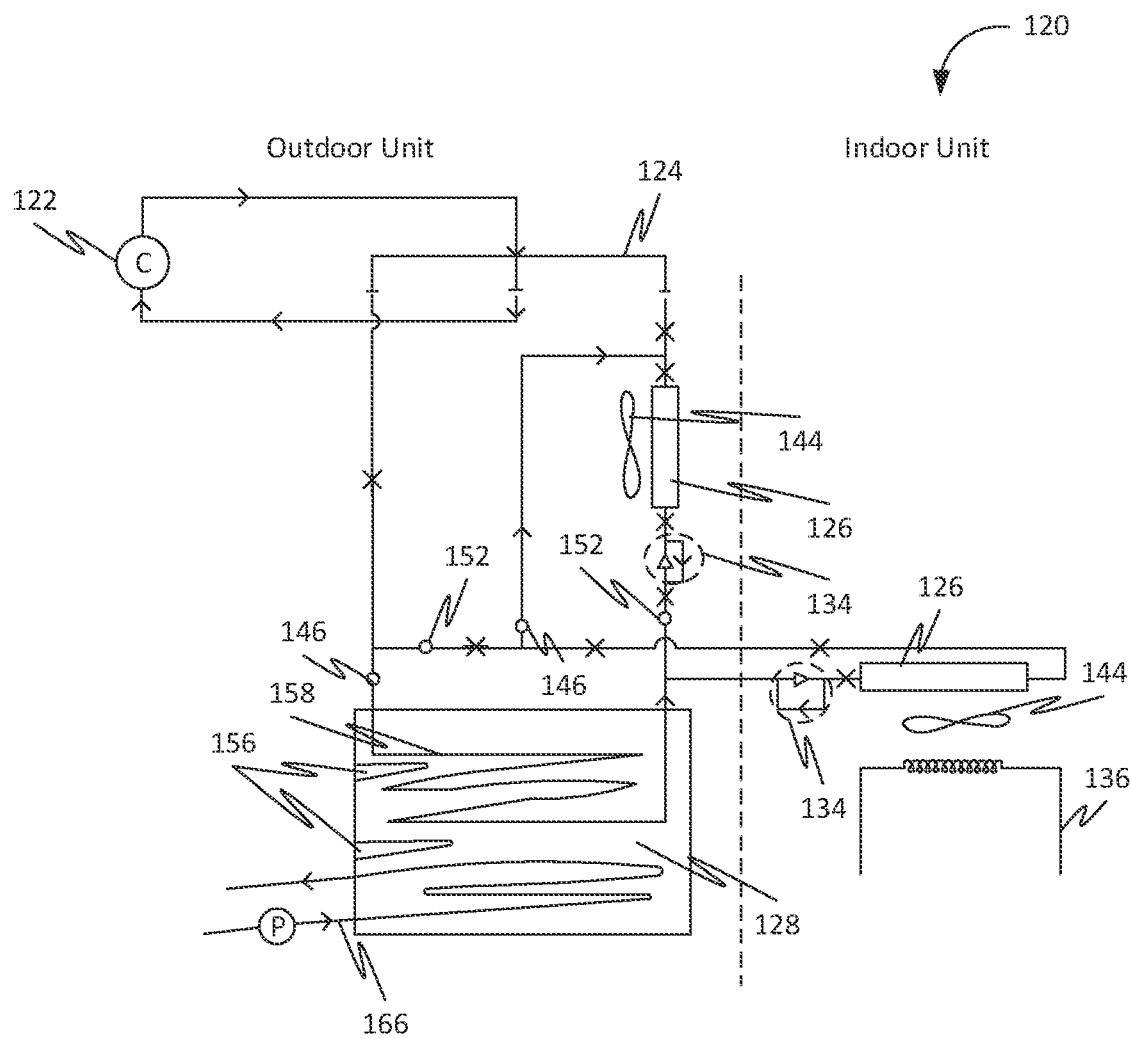
FIG. 3 exemplarily illustrates a schematic view of a heat transfer system 120 for facilitating heat transfer to air and water, according to one embodiment of the present invention.

Referring to FIG. 3, a schematic view of a heat transfer system 120 for facilitating heat transfer to air and water in accordance with some embodiments is disclosed. In one embodiment, the heat transfer system 120 includes a heating cycle, a cooling cycle, etc. Each of the heating cycle and cooling cycle may be associated with an air-to-air cycle and air-to-water cycle. Further, the heat transfer system 120 facilitates the transfer of heat to the air and water using at least one cycle. In one embodiment, the heat transfer system 120 with the heat pump is further configured to initiate sequences of a new heating/cooling/hot-water thermodynamic cycle by means of the operating system or smart control system 105.

In one embodiment, the heat transfer system 120 includes an outdoor unit and an indoor unit. In one embodiment, the outdoor unit comprises, but not limited to, a compressor 122, a refrigerant to air heat exchanger 126, and a storage tank 128. In one embodiment, the indoor unit comprises, but not limited to, an indoor coil 126 and auxiliary heating elements 136. In one embodiment, the heat transfer system 120 includes a refrigerant switchover valve 124 having an inlet and an outlet, a hydronic heating system, at least one one-directional thermostatic expansion valve 134, at least one or more solenoid valves (146 and 152), an external refrigerant to water heat exchanger 158, at least one electrical heating element kit 156, and at least one coil blower fan 144. Further, in an embodiment, the heat transfer system 120 may not include the storage tank 128.

In one embodiment, the compressor 122 may include an inlet and an outlet. The compressor 122 is configured to pump a fluid, for example, a refrigerant from the inlet to outlet. In one embodiment, the inlet of the refrigerant switchover valve 124 is fluidly coupled to the outlet of the compressor 122. The inlet of the refrigerant switchover valve 124 could facilitate the flow of the fluid from the outlet of the compressor 122 to the inlet of the refrigerant switchover valve 124. Further, a first valve outlet of the at least one valve outlet could be connected to the inlet of the compressor 122. Further, the first valve outlet may facilitate the flow of the fluid from the first valve outlet to the inlet of the compressor 122. In one embodiment, the refrigerant switchover valve 124 is configured for the reversal of the flow of the fluid.

In one embodiment, the compressor 122 is further configured to pump a low-pressure refrigerant to a high-pressure side of the heat transfer system, thereby transforming the low-pressure refrigerant into a high pressure refrigerant. In one embodiment, the refrigerant switchover valve 124 could reverse the direction associated with a cooling and heating cycle. In one embodiment, the refrigerant switchover valve 124 could re-route the refrigerant flow, thereby making a refrigerant to air heat exchanger 126 to function as an evaporator and an indoor coil 132 to function as a condenser. In one embodiment, the refrigerant switchover valve 124 could again re-route the refrigerant flow, thereby making the refrigerant to air heat exchanger 126 to function as a condenser and the indoor coil 132 to function as an evaporator. In one embodiment, the refrigerants to air heat exchangers 126 are outdoor heat exchanger and the indoor heat exchanger, respectively.

In one embodiment, the refrigerant to air heat exchanger 126 could be function as a condenser and an evaporator. The refrigerant to air heat exchanger 126 could be fluidly coupled with the refrigerant switchover valve 124 using a second valve duct. The refrigerant to air heat exchanger 126 includes an inlet and an outlet. In one embodiment, the inlet of the refrigerant to air heat exchanger 126 is connected to an outlet of the second valve of the at least one valve outlet using the second valve duct, which facilitates at least one of the flow of the fluid from the inlet of the refrigerant to air heat exchanger 126 to the second valve outlet and vice versa. In one embodiment, the refrigerant to air heat exchanger 126 is configured to facilitate the transfer of heat between the fluid and an outdoor environment associated with the refrigerant to air heat exchanger 126. In one embodiment, the refrigerant to air heat exchanger 126 is further configured to facilitate the transfer of heat between the fluid and air associated with the outdoor environment.

In one embodiment, the evaporator could vaporize the refrigerant to absorb heat from the surrounding air. Further, the refrigerant may be compressed, thereby raising the temperature and pressure of the refrigerant. In one embodiment, the evaporator could be further utilized for heating water in the storage tank, thereby absorbing the refrigerant in the evaporator and also absorbing the heat from the air. In one embodiment, the refrigerant includes, but not limited to, R744, R404a, and R407C, etc. In one embodiment, the condenser is configured to condense the refrigerant to release the heat of the refrigerant into the surrounding fluid (air or water) and condensing the refrigerant into a liquid.

In one embodiment, the storage tank 128 is configured to store water. In one embodiment, the storage tank 128 comprises an external refrigerant to water heat exchanger 158, which is fluidly connected to the refrigerant to air heat exchanger 126 using an outdoor coil duct (or outdoor duct).

In one embodiment, the external refrigerant to water heat exchanger 158 includes an inlet and an outlet. The outlet of the refrigerant to air heat exchanger 126 is connected to the inlet of the external refrigerant to water heat exchanger heat exchanger 158 using the outdoor coil duct, which facilitates at least one of the flow of fluid from the outlet of the outdoor coil or refrigerant to air heat exchanger 126 to the inlet of the external refrigerant to water heat exchanger 158 and vice versa. In one embodiment, the external refrigerant to water heat exchanger 158 is fluidly coupled with the refrigerant switchover valve 124 using a secondary coil duct. The secondary coil duct facilitates at least one flow of the fluid from the outlet of the external refrigerant to water heat exchanger 158 to the third valve outlet and the flow of the fluid from the third valve outlet to the outlet of the external refrigerant to water heat exchanger 158. In one embodiment, the external refrigerant to water heat exchanger 158 is configured to heat the water stored in the storage tank 128. In one embodiment, the refrigerant could flow into the external refrigerant to water heat exchanger 158, thereby condensing the refrigerant into a liquid. In one embodiment, the refrigerant could transfer the heat to the water inside the storage tank 128, thereby increasing the temperature of the water inside the storage tank 128. In one embodiment, the storage tank 128 further comprises at least one or more electrical heating element kits 156, which are securely disposed within the storage tank 128. In one embodiment, the electrical heating element kits 156 are configured to heat the water stored within the storage tank 128.

In one embodiment, the storage tank 128 comprises a cold water inlet at the bottom portion and a hot water outlet at the top portion of the storage tank 128. The cold water inlet of the storage tank 128 could facilitate the inflow of cold water into the storage tank 128 and the hot water outlet could facilitate the outflow of hot water from the storage tank 128.

In one embodiment, the storage tank 128 further comprises one or more temperature sensors for analyzing and suggesting showering time according to the forecast of weather and electrical pick price to users. In one embodiment, the electrical heating element kits 156 are configured to encounter resistance, thereby heating the water stored in the storage tank 128. In one embodiment, the electrical heating element kits 142 are made of a material, but not limited to, a metal, a ceramic, a semiconductor material, etc. In one embodiment, the storage tank 128 further comprises a hydronic coil 166. The hydronic coil 166 is configured to facilitate the transfer of heat between the hydronic fluid and water stored in the storage tank 128.

In one embodiment, the indoor coil 132 could be function as a condenser and an evaporator. The indoor coil 132 comprises an inlet and an outlet. In one embodiment, the indoor coil 132 is fluidly coupled with the refrigerant to air heat exchanger 126 and the external refrigerant to water heat exchanger 158 using a first indoor duct, which facilitates at least one of the fluid flow from the inlet of the indoor coil 132 to the outlet of the refrigerant to air heat exchanger 126 and the inlet of the external refrigerant to water heat exchanger 158. In one embodiment, the first indoor duct facilitates the flow of the fluid from the outlet of the refrigerant to air heat exchanger 126 and the inlet of the secondary coil 140 to the inlet of the indoor coil 132. In one embodiment, the refrigerant to air heat exchanger 126 may be fluidly coupled with the refrigerant switchover valve 124 and the external refrigerant to water heat exchanger 158 using a second indoor duct. The outlet of the refrigerant to air heat exchanger 126 could be connected to the third valve outlet and the outlet of the external refrigerant to water heat exchanger 158 using the second indoor duct.

In one embodiment, the second indoor duct could facilitate at least one of the flow of a fluid from the outlet of the refrigerant to air heat exchanger 126 to the third valve outlet and the outlet of the external refrigerant to water heat exchanger 158. In one embodiment, the second indoor duct could also facilitate the flow of the fluid from both third valve outlet and the outlet of the external refrigerant to water heat exchanger 158 to the outlet of the refrigerant to air heat exchanger 126. In one embodiment, the refrigerant to air heat exchanger 126 may be fluidly coupled with the refrigerant switchover valve 124 and the refrigerant to air heat exchanger 126 using a third indoor duct. In one embodiment, the outlet of the indoor coil 132 could be connected to the second valve outlet and the inlet of the refrigerant to air heat exchanger 126 using the third indoor duct. In one embodiment, the third indoor duct may facilitate at least one of the flow of the fluid from the outlet of the refrigerant to air heat exchanger 126 to the second valve outlet and the inlet of the refrigerant to air heat exchanger 126. In one embodiment, the third indoor duct may also facilitate the flow of the fluid from the second valve outlet and the inlet of the refrigerant to air heat exchanger 126 to the outlet of the refrigerant to air heat exchanger 126. In one embodiment, the refrigerant to air heat exchanger 126 is configured to facilitate the transfer of heat between the fluid and an indoor environment. Further, the refrigerant to air heat exchanger 126 may facilitate the transfer of heat between the fluid and air associated with the indoor environment according to one embodiment of the present invention.

In one embodiment, the auxiliary heating elements 136 are disposed proximal to the refrigerant to air heat exchanger 126. The auxiliary heating elements 136 may facilitate to heat the indoor environment. Further, the auxiliary heating elements 136 may also facilitate to heat the air associated with the indoor environment.

In one embodiment, at least one one-directional thermostatic expansion valve (TEV-TXV) 134 is securely disposed on the outdoor coil duct and the first indoor duct, respectively. The one-directional thermostatic expansion valve 134 disposed on the outdoor coil duct is configured to facilitate measuring of the fluid flow in the outdoor coil duct. In one embodiment, the one-directional thermostatic expansion valve 134 disposed on the first indoor duct is configured to facilitate measuring of the fluid flow in the first indoor duct.

In one embodiment, at least one solenoid valve 146 could be disposed on the outdoor coil duct proximal to the inlet of the external refrigerant to water heat exchanger 158. In one embodiment, the solenoid valve 146 disposed on the outdoor coil duct is configured to facilitate managing of the fluid flow in the outer coil duct. In one embodiment, at least one solenoid valve 152 could be disposed on the secondary coil duct proximal to the outlet of the external refrigerant to water heat exchanger 158. In one embodiment, the solenoid valve 152 disposed on the secondary coil duct is configured to facilitate managing of the fluid flow in the secondary coil duct. In one embodiment, at least one solenoid valve 152 could be disposed on the second indoor duct proximal to the outlet of the external refrigerant to water heat exchanger 158. In one embodiment, the solenoid valve 152 disposed on the second indoor duct is configured to facilitate managing of the fluid flow in the second indoor duct. Further, at least one solenoid valve 146 could be disposed on the third indoor duct. In one embodiment, the solenoid valve 146 disposed on the third indoor duct is configured to facilitate managing of the fluid flow in the third indoor duct. In one embodiment, the solenoid valve 146 is further configured to facilitate shutting off or release of the refrigerant flow in the heat transfer system 120.

In one embodiment, at least one coil blower fan 144 could be disposed proximal to the refrigerant to air heat exchanger 126. The coil blower fan 144 disposed proximal to the refrigerant to air heat exchanger 126 is configured to facilitate transferring of heat between the fluid in the refrigerant to air heat exchanger 126 and the outdoor environment. In one embodiment, at least one coil blower fan 144 could be disposed proximal to the refrigerant to air heat exchanger 126. The coil blower fan 144 disposed proximal to the refrigerant to air heat exchanger 126 is configured to facilitate transferring of heat between the fluid in the refrigerant to air heat exchanger 126 and the indoor environment.

In one embodiment, the heat transfer system 120 further comprises at least one temperature sensor, a processing device, a communication device, and a storage device. In one embodiment, the temperature sensor is configured to generate temperature data of water stored in the storage tank, outdoor environment, and the indoor environment. In one embodiment, the storage device is configured to retrieve electricity price data from an external database. In one embodiment, the processing device is in communication with the at least one temperature sensor. In one embodiment, the processing device is configured to analyze the temperature data and the electricity price data, thereby generating notifications for the users. In one embodiment, the communication device is configured to transfer at least one notification to the user device (104 and 106) (shown in FIG. 1) such as, but not limited to, a smart phone, a mobile device, a laptop, a tablet computer, etc., which is associated with at least one user 116.

In one embodiment, the heat transfer system 120 further comprises a multifunctional heat pump for providing air cooling, air heating, and water heating in accordance with some embodiments. In one embodiment, the heat transfer system 120 further comprises different components such as, but not limited to, security systems, lighting systems, information systems, etc. In one embodiment, the heat transfer system 120 further comprises a centralized computer-implemented system or a smart control system for facilitating the management of the heat transfer system.

Figure 4:
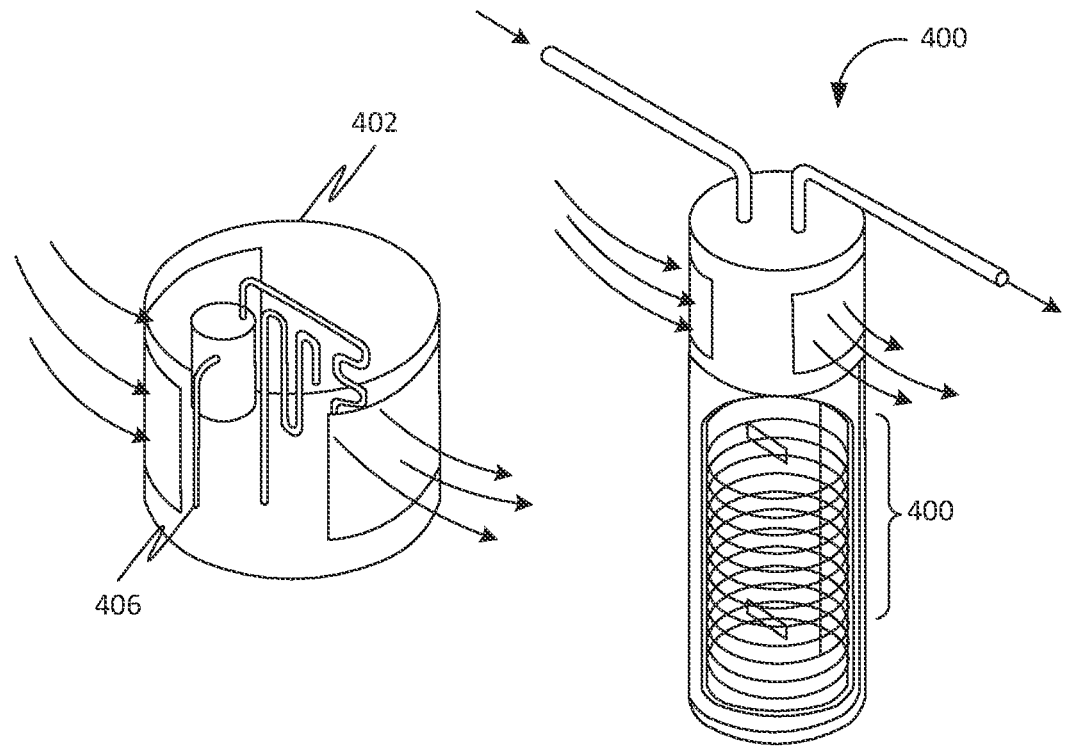
FIG. 4 exemplarily illustrates a perspective view of a heat pump water heater, in accordance with a prior art.

Referring to FIG. 4, a perspective view of a heat pump water heater 400, in accordance with the prior art. In one embodiment, the heat pump water heater 400 is configured to provide hot water using at least one heat pump 402, electric heating elements 404, and a compressor 406.

Figure 5:
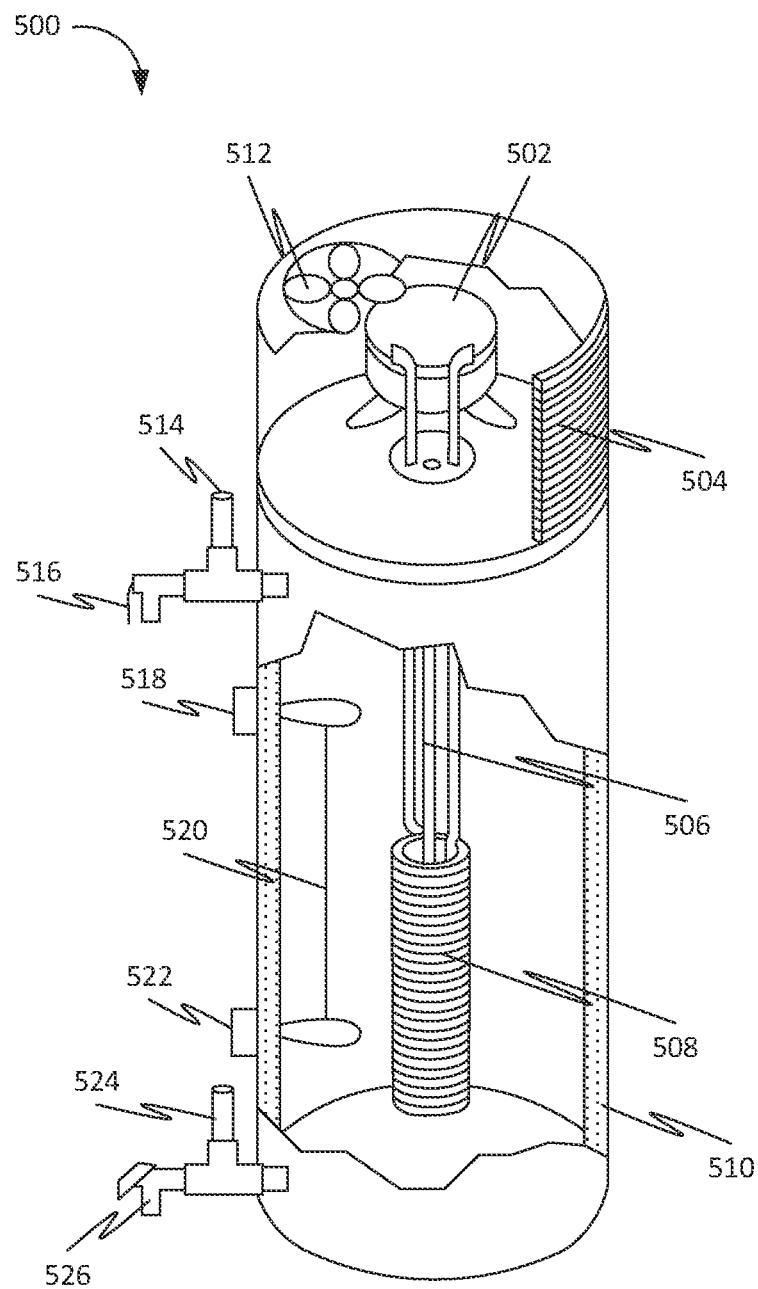
FIG. 5 exemplarily illustrates a perspective view of a heat pump water heater, in accordance with a prior art.

Referring to FIG. 5, a perspective view of a heat pump water heater 500, in accordance with another prior art. In one embodiment, the heat pump water heater 500 is configured to provide hot water using at least one heat pump, a compressor 502, an evaporator 504, an anode 506, a condenser 508, a fan 512, resistance elements 520, thermostats (518 and 522). In one embodiment, the heat pump water heater 500 further comprises a housing having insulation 510. In one embodiment, the heat pump water heater 500 further comprises a hot water outlet 514, temperature/pressure relief valve 516, a cold water inlet 524, and a drain 526.

Figure 6:
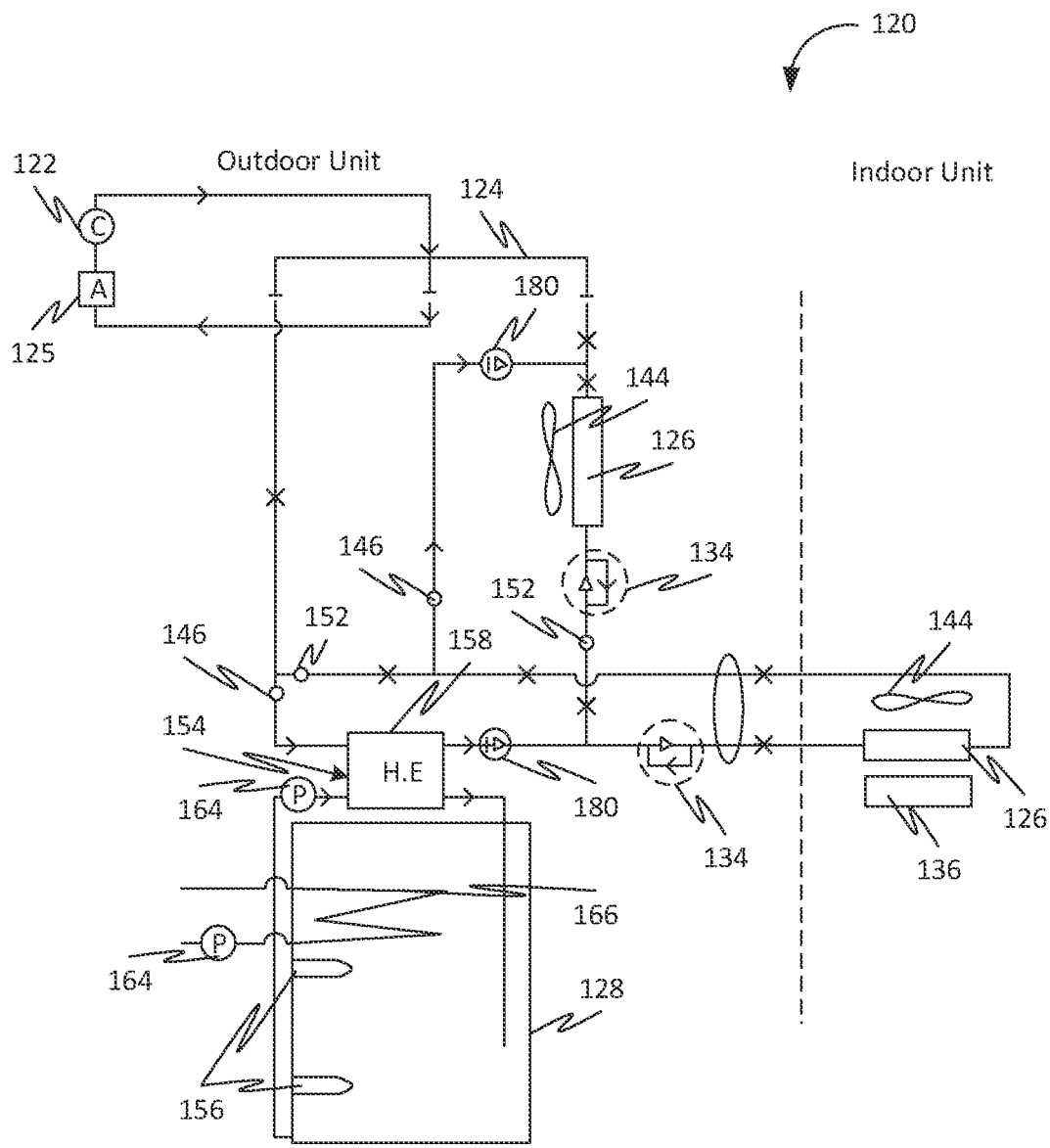
FIG. 6 exemplarily illustrates a schematic view of a heat transfer system used with a hydronic heating system for facilitating heat transfer to air and water, according to one embodiment of the present invention.

Referring to FIG. 6, a schematic view of a heat transfer system 120 used with the hydronic heating system 154 for facilitating heat transfer to air and water in accordance with some embodiments is disclosed. In one embodiment, an accumulator 125 is disposed proximate to the compressor 122. The accumulator 125 is configured to prevent the liquid refrigerant flood-back to the compressor 122. In one embodiment, the heat transfer system 120 used with the hydronic heating system 154 includes a heating cycle, a cooling cycle, etc. Each of the heating cycle and cooling cycle may be associated with an air-to-air cycle and air-to-water cycle. In one embodiment, the heat transfer system 120 includes an outdoor unit and an indoor unit. In one embodiment, the outdoor unit comprises, but not limited to, a compressor 122, an refrigerant to air heat exchanger 126, and a storage tank 128. In one embodiment, the indoor unit comprises, but not limited to, refrigerant to air heat exchanger 126 and auxiliary heating elements 136. In one embodiment, the indoor unit could be provided with one or more heads. In one embodiment, the heat transfer system 120 includes a refrigerant switchover valve 124 having an inlet and outlet, a hydronic heating system 154, at least one one-directional thermostatic expansion valve 134, at least one or more solenoid valves (146 and 152), an external refrigerant to water heat exchanger 158, at least one electrical heating element kit 156, and at least one coil blower fan 144. In one embodiment, the refrigerant to air heat exchanger 126 could be function as a condenser and an evaporator. In one embodiment, the refrigerant to air heat exchanger 126 could be function as a condenser and an evaporator. In one embodiment, the hydronic heating system 154 is fluidly connected to the external refrigerant to water heat exchanger 158 via a hydronic pump 164. In one embodiment, the external refrigerant to water heat exchanger 158 is disposed between both refrigerant to air heat exchangers 126 using a solenoid valve 146 and a one directional solenoid valve 152. The outlet of the refrigerant to air heat exchanger 126 is fluidly connected to the outlet of the external refrigerant to water heat exchanger 158 via the one directional solenoid valve 152. In one embodiment, the outlet of the refrigerant to air heat exchanger 126 is fluidly connected to the inlet of the refrigerant to water heat exchanger 158 via the one directional solenoid valve 152 and the solenoid valve 146. In one embodiment, at least one one-directional thermostatic expansion valve 134 is securely disposed on the outdoor coil duct to facilitate measuring of the fluid flow in the outdoor coil duct. In one embodiment, at least one check valve 180 could be disposed at the inlet of the refrigerant to air heat exchanger 126 and at least one check valve 180 could be disposed at the outlet of the external refrigerant to water heat exchanger 158.

In one embodiment, the hydronic heating system 154 comprises a water or glycol to water heat exchanger 166 and a hydronic pump 164. In one embodiment, the water or glycol to water heat exchanger 166 could be disposed within the storage tank 128. The hydronic pump 164 is configured to circulate a hydronic fluid, for example, water between the hydronic coil 166 and a heat exchanger or an external refrigerant to water heat exchanger 158.

In one embodiment, the water or glycol to water heat exchanger 166 is configured to facilitate the transfer of heat between the hydronic fluid and water stored in the storage tank 128. In one embodiment, the hydronic heating system 154 is further configured to allow the circulation of hot water in the storage tank 128 between heat exchangers 158 located inside or outside of the storage tank 128. The hot water in the storage tank 128 could be used for floor heating inside houses. In one embodiment, the hydronic heating system 154 further comprises one or more electrical element kit 156 for heating the water stored in the storage tank 128.

Figure 7:
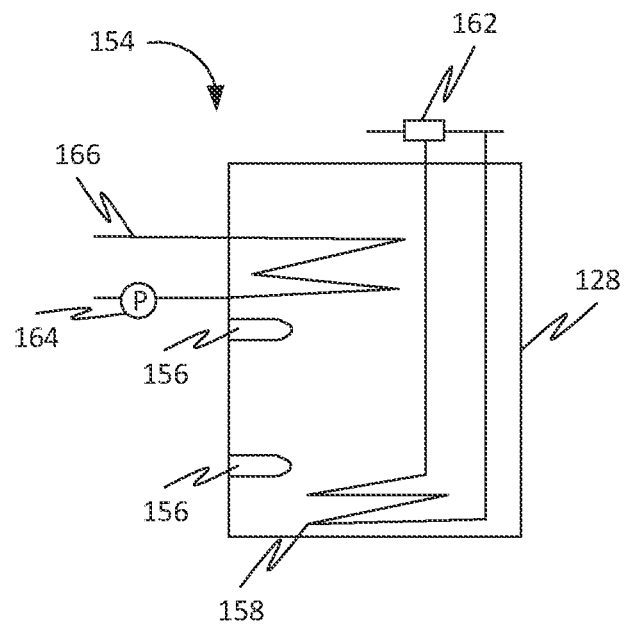
FIG. 7 exemplarily illustrates a schematic view of the hydronic heating system for facilitating heat transfer to air and water in accordance with some embodiments of the present invention.

Referring to FIG. 7, a schematic view of the hydronic heating system 154 for facilitating heat transfer to air and water in accordance with some embodiments is disclosed. In one embodiment, the water or glycol to water heat exchanger 166 of the hydronic heating system 154 is connected across the head pressure control (HPC) valve 162. In one embodiment, the head pressure control valve 162 is configured to control the flow of hot water in the storage tank 128 and between the refrigerant in water heat exchanger 158 located inside or outside of the storage tank 128. In one embodiment, the refrigerant to water heat exchanger 158 could be positioned within the storage tank 128.

Figure 8:
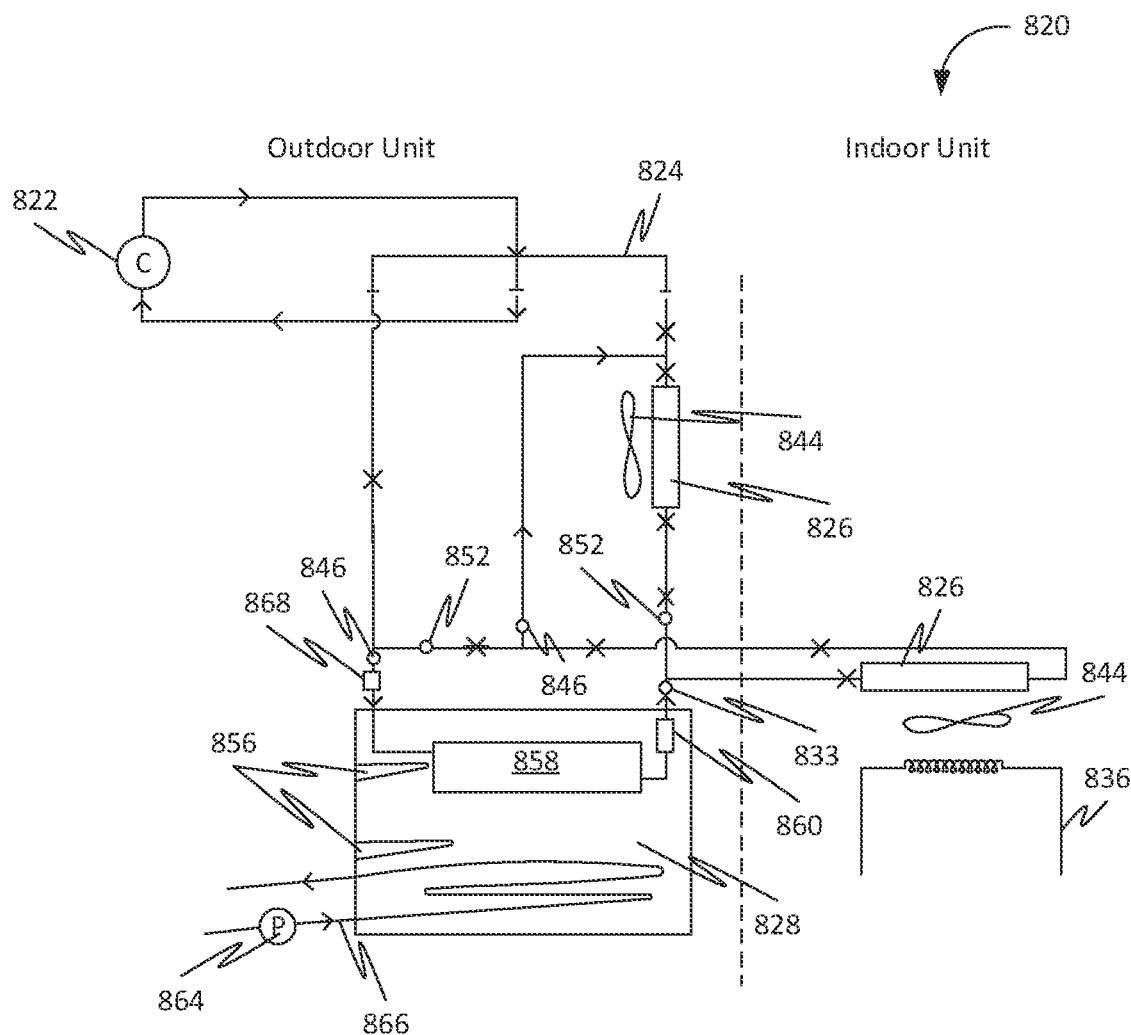
FIG. 8 exemplarily illustrates a schematic view of a heat transfer system 820 for facilitating heat transfer to air and water, in accordance with some embodiments.

Referring to FIG. 8, a schematic view of a heat transfer system 820 for facilitating heat transfer to air and water in accordance with some embodiments is disclosed. In one embodiment, the heat transfer system 820 includes a heating cycle, a cooling cycle, etc. Each of the heating cycle and cooling cycle may be associated with an air-to-air cycle and air-to-water cycle. Further, the heat transfer system 820 facilitates the transfer of heat to the air and water using at least one cycle. In one embodiment, the heat transfer system 820 with the heat pump is further configured to initiate sequences of a new heating/cooling/hot-water thermodynamic cycle by means of the operating system or smart control system 805.

In one embodiment, the heat transfer system 820 includes an outdoor unit and an indoor unit. In one embodiment, the outdoor unit comprises, but not limited to, a compressor 822 (also referred to as Com. in the drawings), a refrigerant to air heat exchanger 826 (also referred to as condenser/evaporator in the drawings), and a storage tank 828. In one embodiment, the indoor unit comprises, but not limited to, an indoor coil 826 and auxiliary heating elements 836. In one embodiment, the heat transfer system 820 includes a refrigerant reversing valve 824 having an inlet and an outlet, a hydronic heating system, at least one regular one direction thermostatic expansion valve 833, at least one or more solenoid valves and solenoid valves (846 and 852), an external refrigerant to water heat exchanger 858 (indicated as HEX in the drawing), at least one electrical heating element kit 856, and at least one coil blower fan 844. Further, the refrigerant reversing valve 824 may include a reversing valve. Further, the one or more solenoid valve 846 may be a regular one direction solenoid valve. Further, in an embodiment, the heat transfer system 820 may not include the storage tank 828.

In one embodiment, the compressor 822 may include an inlet and an outlet. The compressor 822 is configured to pump a fluid, for example, a refrigerant from the inlet to outlet. In one embodiment, the inlet of the refrigerant reversing valve 824 is fluidly coupled to the outlet of the compressor 822. The inlet of the refrigerant reversing valve 824 could facilitate the flow of the fluid from the outlet of the compressor 822 to the inlet of the refrigerant reversing valve 824. Further, a first valve outlet of the at least one valve outlet could be connected to the inlet of the compressor 822. Further, the first valve outlet may facilitate the flow of the fluid from the first valve outlet to the inlet of the compressor 822. In one embodiment, the refrigerant reversing valve 824 is configured for the reversal of the flow of the fluid.

In one embodiment, the compressor 822 is further configured to pump a low-pressure refrigerant to a high-pressure side of the heat transfer system, thereby transforming the low-pressure refrigerant into a high pressure refrigerant. In one embodiment, the refrigerant reversing valve 824 could reverse the direction associated with a cooling and heating cycle. In one embodiment, the refrigerant reversing valve 824 could re-route the refrigerant flow, thereby making a refrigerant to air heat exchanger 826 to function as an evaporator and an indoor coil 832 to function as a condenser.

In one embodiment, the refrigerant reversing valve 824 could again re-route the refrigerant flow, thereby making the refrigerant to air heat exchanger 826 to function as a condenser and the indoor coil 832 to function as an evaporator. In one embodiment, the refrigerants to air heat exchangers 826 are outdoor heat exchangers and the indoor heat exchanger, respectively.

In one embodiment, the refrigerant to air heat exchanger 826 could be function as a condenser and an evaporator. The refrigerant to air heat exchanger 826 could be fluidly coupled with the refrigerant reversing valve 824 using a second valve duct. The refrigerant to air heat exchanger 826 includes an inlet and an outlet. In one embodiment, the inlet of the refrigerant to air heat exchanger 826 is connected to an outlet of the second valve of the at least one valve outlet using the second valve duct, which facilitates at least one of the flow of the fluid from the inlet of the refrigerant to air heat exchanger 826 to the second valve outlet and vice versa. In one embodiment, the refrigerant to air heat exchanger 826 is configured to facilitate the transfer of heat between the fluid and an outdoor environment associated with the refrigerant to air heat exchanger 826. In one embodiment, the refrigerant to air heat exchanger 826 is further configured to facilitate the transfer of heat between the fluid and air associated with the outdoor environment.

In one embodiment, the evaporator could vaporize the refrigerant to absorb heat from the surrounding air. Further, the refrigerant may be compressed, thereby raising the temperature and pressure of the refrigerant. In one embodiment, the evaporator could be further utilized for heating water in the storage tank, thereby absorbing the refrigerant in the evaporator and also absorbing the heat from the air. In one embodiment, the refrigerant includes, but not limited to, R744, R404a, and R407C, etc. In one embodiment, the condenser is configured to condense the refrigerant to release the heat of the refrigerant into the surrounding fluid (air or water) and condensing the refrigerant into a liquid.

In one embodiment, the storage tank 828 is configured to store water. In one embodiment, the storage tank 828 comprises an external refrigerant to water heat exchanger 858, which is fluidly connected to the refrigerant to air heat exchanger 826 using an outdoor coil duct (or outdoor duct). In one embodiment, the external refrigerant to water heat exchanger 858 includes an inlet and an outlet. The outlet of the refrigerant to air heat exchanger 826 is connected to the inlet of the external refrigerant to water heat exchanger heat exchanger 858 using the outdoor coil duct, which facilitates at least one of the flow of fluid from the outlet of the outdoor coil or refrigerant to air heat exchanger 826 to the inlet of the external refrigerant to water heat exchanger 858 and vice versa. In one embodiment, the external refrigerant to water heat exchanger 858 is fluidly coupled with the refrigerant reversing valve 824 using a secondary coil duct. The secondary coil duct facilitates at least one flow of the fluid from the outlet of the external refrigerant to water heat exchanger 858 to the third valve outlet and the flow of the fluid from the third valve outlet to the outlet of the external refrigerant to water heat exchanger 858. In one embodiment, the external refrigerant to water heat exchanger 858 is configured to heat the water stored in the storage tank 828. In one embodiment, the refrigerant could flow into the external refrigerant to water heat exchanger 858, thereby condensing the refrigerant into a liquid. In one embodiment, the refrigerant could transfer the heat to the water inside the storage tank 828, thereby increasing the temperature of the water inside the storage tank 828. In one embodiment, the storage tank 828 further comprises at least one or more electrical heating element kits 856, which are securely disposed within the storage tank 828. In one embodiment, the electrical heating element kits 856 are configured to heat the water stored within the storage tank 828.

In one embodiment, the storage tank 828 comprises a cold water inlet at the bottom portion and a hot water outlet at the top portion of the storage tank 828. The cold water inlet of the storage tank 828 could facilitate the inflow of cold water into the storage tank 828 and the hot water outlet could facilitate the outflow of hot water from the storage tank 828.

In one embodiment, the storage tank 828 further comprises one or more temperature sensors for analyzing and suggesting showering time according to the forecast of weather and electrical pick price to users. In one embodiment, the electrical heating element kits 856 are configured to encounter resistance, thereby heating the water stored in the storage tank 828. In one embodiment, the electrical heating element kits 842 are made of a material, but not limited to, a metal, a ceramic, a semiconductor material, etc. In one embodiment, the storage tank 828 further comprises a hydronic coil 866 (referred to as Hyd. in the drawings). The hydronic coil 866 is configured to facilitate the transfer of heat between the hydronic fluid and water stored in the storage tank 828. For example, the hydronic coil 866 may transfer the heat from the water of the tank to the water or glycol within the hydronic coil 866.

In one embodiment, the indoor coil 832 could be function as a condenser and an evaporator. The indoor coil 832 comprises an inlet and an outlet. In one embodiment, the indoor coil 832 is fluidly coupled with the refrigerant to air heat exchanger 826 and the external refrigerant to water heat exchanger 858 using a first indoor duct, which facilitates at least one of the fluid flow from the inlet of the indoor coil 832 to the outlet of the refrigerant to air heat exchanger 826 and the inlet of the external refrigerant to water heat exchanger 858. In one embodiment, the first indoor duct facilitates the flow of the fluid from the outlet of the refrigerant to air heat exchanger 826 and the inlet of the secondary coil 840 to the inlet of the indoor coil 832. In one embodiment, the refrigerant to air heat exchanger 826 may be fluidly coupled with the refrigerant reversing valve 824 and the external refrigerant to water heat exchanger 858 using a second indoor duct. The outlet of the refrigerant to air heat exchanger 826 could be connected to the third valve outlet and the outlet of the external refrigerant to water heat exchanger 858 using the second indoor duct.

In one embodiment, the second indoor duct could facilitate at least one of the flow of a fluid from the outlet of the refrigerant to air heat exchanger 826 to the third valve outlet and the outlet of the external refrigerant to water heat exchanger 858. In one embodiment, the second indoor duct could also facilitate the flow of the fluid from both third valve outlet and the outlet of the external refrigerant to water heat exchanger 858 to the outlet of the refrigerant to air heat exchanger 826. In one embodiment, the refrigerant to air heat exchanger 826 may be fluidly coupled with the refrigerant reversing valve 824 and the refrigerant to air heat exchanger 826 using a third indoor duct. In one embodiment, the outlet of the indoor coil 832 could be connected to the second valve outlet and the inlet of the refrigerant to air heat exchanger 826 using the third indoor duct. In one embodiment, the third indoor duct may facilitate at least one of the flow of the fluid from the outlet of the refrigerant to air heat exchanger 826 to the second valve outlet and the inlet of the refrigerant to air heat exchanger 826. In one embodiment, the third indoor duct may also facilitate the flow of the fluid from the second valve outlet and the inlet of the refrigerant to air heat exchanger 826 to the outlet of the refrigerant to air heat exchanger 826. In one embodiment, the refrigerant to air heat exchanger 826 is configured to facilitate the transfer of heat between the fluid and an indoor environment. Further, the refrigerant to air heat exchanger 826 may facilitate the transfer of heat between the fluid and air associated with the indoor environment according to one embodiment of the present invention.

In one embodiment, the auxiliary heating elements 836 are disposed proximal to the refrigerant to air heat exchanger 826. The auxiliary heating elements 836 may facilitate to heat the indoor environment. Further, the auxiliary heating elements 836 may also facilitate to heat the air associated with the indoor environment.

In one embodiment, at least one regular one direction thermostatic expansion valve (TXV) is securely disposed on the outdoor coil duct and the first indoor duct, respectively. The regular one direction thermostatic expansion valve 833 disposed on the outdoor coil duct is configured to facilitate measuring of the fluid flow in one of the outdoor coil duct and the first indoor duct. Further, the at least one regular one direction thermostatic expansion valve (TXV) may be fluidly coupled with the outdoor outlet of the outdoor heat exchanger (such as the refrigerant to air heat exchanger 826), the indoor inlet of the indoor heat exchanger (such as the refrigerant to air heat exchanger 826), and the secondary inlet of the secondary heat exchanger (such as the external refrigerant to water heat exchanger 858). Further, the at least one regular one direction thermostatic expansion valve 833 (or regular one direction thermostatic expansion valve) may be configured to facilitate the fluid flow in the outdoor duct and the first indoor duct.

In one embodiment, at least one solenoid valve 846 could be disposed on the outdoor coil duct proximal to the inlet of the external refrigerant to water heat exchanger 858. In one embodiment, the solenoid valve 846 disposed on the outdoor coil duct is configured to facilitate managing of the fluid flow in the outer coil duct. In one embodiment, one of the at least one solenoid valve 846 and the at least one solenoid valve 852 could be disposed on the secondary coil duct proximal to the outlet of the external refrigerant to water heat exchanger 858 that may be configured to facilitate managing of the fluid flow in the secondary coil duct. In one embodiment, one of the solenoid valve 846 and the at least one solenoid valve 852 could be disposed on the second indoor duct proximal to the outlet of the external refrigerant to water heat exchanger 858 that may be configured to facilitate managing of the fluid flow in the second indoor duct. Further, at least one solenoid valve 846 could be disposed on the third indoor duct. In one embodiment, the solenoid valve 846 disposed on the third indoor duct is configured to facilitate managing of the fluid flow in the third indoor duct. In one embodiment, the solenoid valve 846 is further configured to facilitate shutting off or release of the refrigerant flow in the heat transfer system 820.

In one embodiment, at least one coil blower fan 844 could be disposed proximal to the refrigerant to air heat exchanger 826. The coil blower fan 844 disposed proximal to the refrigerant to air heat exchanger 826 is configured to facilitate transferring of heat between the fluid in the refrigerant to air heat exchanger 826 and the outdoor environment. In one embodiment, at least one coil blower fan 844 could be disposed proximal to the refrigerant to air heat exchanger 826. The coil blower fan 844 disposed proximal to the refrigerant to air heat exchanger 826 is configured to facilitate transferring of heat between the fluid in the refrigerant to air heat exchanger 826 and the indoor environment.

Further, in some embodiments, the heat transfer system 820 may include a liquid receiver 860 disposed on the outdoor duct between the regular one direction thermostatic expansion valve 833 and the secondary inlet of the secondary heat exchanger (such as the external refrigerant to water heat exchanger 858). Further, the liquid receiver 860 may be configured for receiving the fluid from the outdoor duct and transmitting the fluid to the secondary inlet. Further, in some embodiments, the heat transfer system 820 may include a water circulation pump 868 disposed proximal to the secondary outlet on the third outlet duct. Further, the water circulation pump 868 may be configured for circulating the fluid through the third outlet duct.

In one embodiment, the heat transfer system 820 further comprises at least one temperature sensor, a processing device, a communication device, and a storage device. In one embodiment, the temperature sensor is configured to generate temperature data of water stored in the storage tank, outdoor environment, and the indoor environment. In one embodiment, the storage device is configured to retrieve electricity price data from an external database. In one embodiment, the processing device is in communication with the at least one temperature sensor. In one embodiment, the processing device is configured to analyze the temperature data and the electricity price data, thereby generating notifications for the users. In one embodiment, the communication device is configured to transfer at least one notification to the user device (104 and 106) (shown in FIG. 1) such as, but not limited to, a smart phone, a mobile device, a laptop, a tablet computer, etc., which is associated with at least one user 116.

In one embodiment, the heat transfer system 820 further comprises a multifunctional heat pump for providing air cooling, air heating, and water heating in accordance with some embodiments. In one embodiment, the heat transfer system 820 further comprises different components such as, but not limited to, security systems, lighting systems, information systems, etc. In one embodiment, the heat transfer system 820 further comprises a centralized computer-implemented system or a smart control system for facilitating the management of the heat transfer system.

Figure 9:
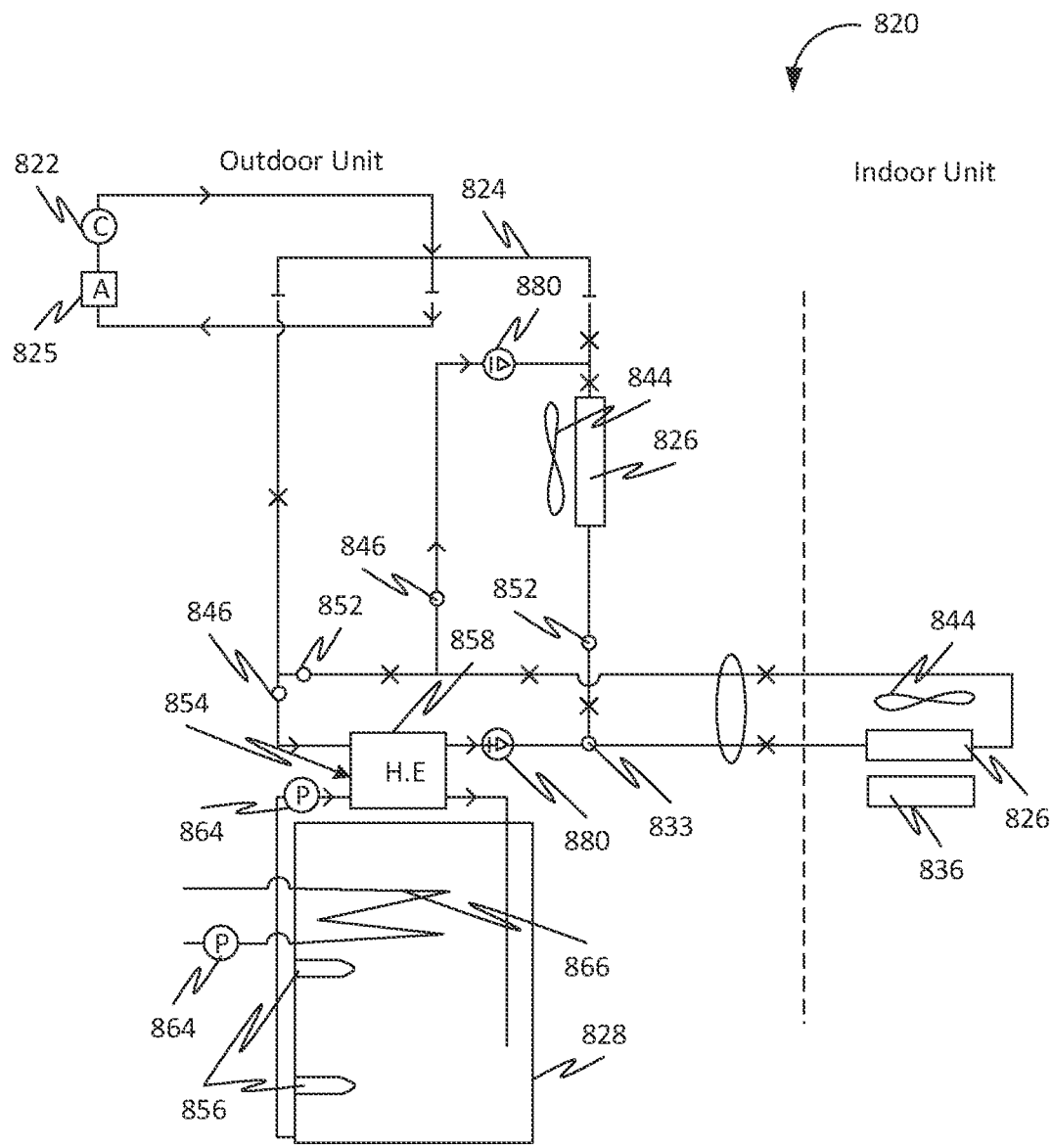
FIG. 9 exemplarily illustrates a schematic view of a heat transfer system used with the hydronic heating system for facilitating heat transfer to air and water, in accordance with some embodiments.

Referring to FIG. 9, a schematic view of a heat transfer system 820 used with the hydronic heating system 854 for facilitating heat transfer to air and water in accordance with some embodiments is disclosed. In one embodiment, an accumulator 825 is disposed proximate to the compressor 822. The accumulator 825 is configured to prevent the liquid refrigerant flood-back to the compressor 822. In one embodiment, the heat transfer system 820 used with the hydronic heating system 854 includes a heating cycle, a cooling cycle, etc. Each of the heating cycle and cooling cycle may be associated with an air-to-air cycle and air-to-water cycle. In one embodiment, the heat transfer system 820 includes an outdoor unit and an indoor unit. In one embodiment, the outdoor unit comprises, but not limited to, a compressor 822, an refrigerant to air heat exchanger 826, and a storage tank 828. In one embodiment, the indoor unit comprises, but not limited to, refrigerant to air heat exchanger 826 and auxiliary heating elements 836. In one embodiment, the indoor unit could be provided with one or more heads. In one embodiment, the heat transfer system 820 includes a refrigerant reversing valve 824 having an inlet and outlet, a hydronic heating system 854, at least one regular one direction thermostatic expansion valve 833, at least one or more solenoid valves (846 and 852), an external refrigerant to water heat exchanger 858, at least one electrical heating element kit 856, and at least one coil blower fan 844. In one embodiment, the refrigerant to air heat exchanger 826 could be function as a condenser and an evaporator. In one embodiment, the refrigerant to air heat exchanger 826 could be function as a condenser and an evaporator. In one embodiment, the hydronic heating system 854 is fluidly connected to the external refrigerant to water heat exchanger 858 via a hydronic pump 864. In one embodiment, the external refrigerant to water heat exchanger 858 is disposed between both refrigerant to air heat exchangers 826 using a solenoid valve 846 and a one directional solenoid valve 852. The outlet of the refrigerant to air heat exchanger 826 is fluidly connected to the outlet of the external refrigerant to water heat exchanger 858 via the one directional solenoid valve 852. In one embodiment, the outlet of the refrigerant to air heat exchanger 826 is fluidly connected to the inlet of the refrigerant to water heat exchanger 858 via the one directional solenoid valve 852 and the solenoid valve 846. In one embodiment, at least one regular one direction thermostatic expansion valve 833 is securely disposed on the outdoor coil duct to facilitate measuring of the fluid flow in the outdoor coil duct. In one embodiment, at least one check valve 880 could be disposed at the inlet of the refrigerant to air heat exchanger 826 and at least one check valve 880 could be disposed at the outlet of the external refrigerant to water heat exchanger 858.

In one embodiment, the hydronic heating system 854 comprises a water or glycol to water heat exchanger 866 and a hydronic pump 864. Further, the water or glycol to water heat exchanger 866 may be an internal heat exchanger. In one embodiment, the water or glycol to water heat exchanger 866 could be disposed within the storage tank 828. The hydronic pump 864 is configured to circulate a hydronic fluid, for example, water between the hydronic coil 866 and a heat exchanger or an external refrigerant to water heat exchanger 858.

In one embodiment, the water or glycol to water heat exchanger 866 is configured to facilitate the transfer of heat between the hydronic fluid and water stored in the storage tank 828. In one embodiment, the hydronic heating system 854 is further configured to allow the circulation of hot water in the storage tank 828 between heat exchangers 858 located inside or outside of the storage tank 828. The hot water in the storage tank 828 could be used for floor heating inside houses. In one embodiment, the hydronic heating system 854 further comprises one or more electrical element kit 856 for heating the water stored in the storage tank 828.

Figure 10:
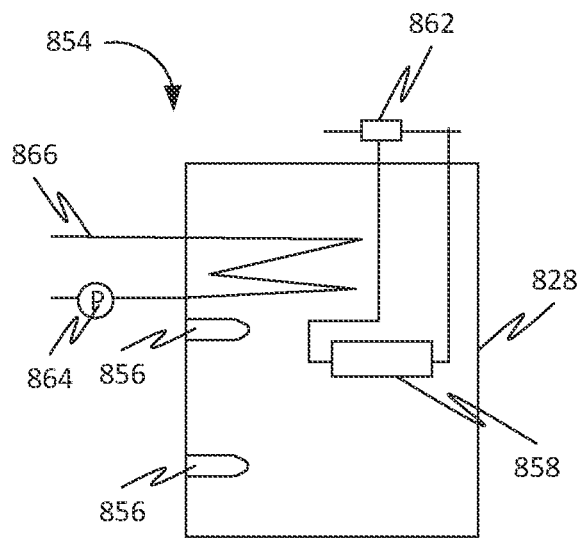
FIG. 10 exemplarily illustrates a schematic view of the hydronic heating system 854 for facilitating heat transfer to air and water, in accordance with some embodiments.

Referring to FIG. 10, a schematic view of the hydronic heating system 854 for facilitating heat transfer to air and water in accordance with some embodiments is disclosed. In one embodiment, the water or glycol to water heat exchanger 866 of the hydronic heating system 854 is connected across the head pressure control (HPC) valve 862. In one embodiment, the head pressure control valve 862 is configured to control the flow of hot water in the storage tank 828 and between the refrigerant to water heat exchanger 858 located inside or outside of the storage tank 828. In one embodiment, the refrigerant to water heat exchanger 858 could be positioned within the storage tank 828.

Figure 11:
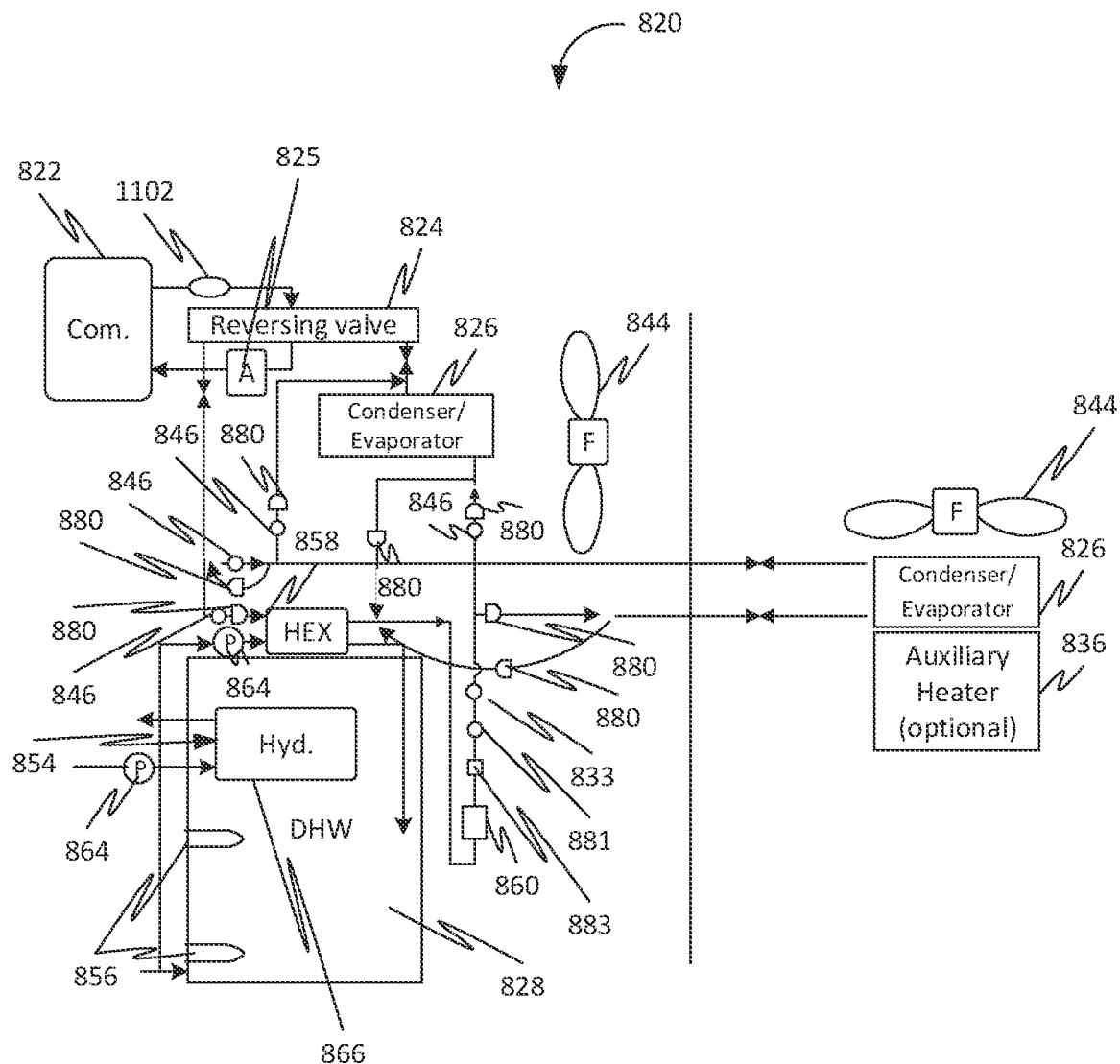
FIG. 11 is a schematic view of the heat transfer system 820 for facilitating heat transfer to air and water in accordance with some embodiments.

FIG. 11 is a schematic view of the heat transfer system 820 for facilitating heat transfer to air and water in accordance with some embodiments. Accordingly, the heat transfer system 820 may include an oil separator 1102 fluidly coupled with the compressor 822 and the refrigerant reversing valve 824. Further, the heat transfer system 820 may include a sight glass 881 disposed between the regular one direction thermostatic expansion valve 833 and the liquid receiver 860. Further, the heat transfer system 820 may include a filter dryer 883 disposed between the sight glass 881 and the liquid receiver 860.

Preferred embodiments of this innovation are described herein, including the best mode known to the inventors for carrying out the innovation. It should be understood that the illustrated embodiments are exemplary only and should not be taken as limiting the scope of the innovation.

The foregoing description comprises illustrative embodiments of the present innovation. Having thus described exemplary embodiments of the present innovation, it should be noted by those skilled in the art that the within disclosures are exemplary only, and that various other alternatives, adaptations, and modifications may be made within the scope of the present innovation. Merely listing or numbering the steps of a method in a certain order does not constitute any limitation on the order of the steps of that method. Many modifications and other embodiments of the innovation will come to mind to one skilled in the art to which this innovation pertains having the benefit of the teachings in the foregoing descriptions. Although specific terms may be employed herein, they are used only in generic and descriptive sense and not for purposes of limitation. Accordingly, the present innovation is not limited to the specific embodiments illustrated herein.

What is claimed is:

1. A heat transfer system for facilitating the transfer of heat to air and water using a heat pump, the heat transfer system comprising:

an outdoor unit, wherein the outdoor unit comprises a compressor, wherein the compressor comprises a compressor inlet and a compressor outlet, wherein the compressor is configured to pump a refrigerant from the compressor inlet to the compressor outlet;

a refrigerant switchover valve fluidly coupled to the compressor, wherein the refrigerant switchover valve is configured to change a direction of a flow of a fluid, wherein the refrigerant switchover valve comprises an inlet duct and one or more outlet ducts, wherein the one or more outlet ducts comprises a first outlet duct, a second outlet duct, and a third outlet duct, wherein the inlet duct is fluidly connected to the compressor outlet, wherein the inlet duct is configured to facilitate the flow of the fluid from the compressor outlet to the inlet duct, wherein the first outlet duct is connected to the compressor inlet, wherein the first outlet duct is configured to facilitate the flow of the fluid from the first outlet duct to the compressor inlet;

an outdoor heat exchanger fluidly coupled to the refrigerant switchover valve via the second outlet duct, wherein the outdoor heat exchanger is configured to facilitate the transfer of the heat between the fluid and an outdoor environment associated with a condenser, wherein the outdoor heat exchanger comprises an outdoor inlet and an outdoor outlet, wherein the outdoor inlet is fluidly connected to the second outlet duct, wherein the outdoor inlet is configured to facilitate one of the fluid flow from the outdoor inlet to the second outlet duct and the fluid flow from the second outlet duct to the outdoor inlet;

a storage tank for storing water, wherein the storage tank comprises a secondary heat exchanger, wherein the secondary heat exchanger comprises a brazed plate heat exchanger configured to facilitate the heating of the water stored in the storage tank, wherein the secondary heat exchanger comprises a secondary inlet and a secondary outlet, wherein the secondary inlet is fluidly coupled to the outdoor outlet of the outdoor heat exchanger via an outdoor duct, wherein the secondary inlet is configured to facilitate at least one of the fluid flow from the outdoor outlet to the secondary inlet and the fluid flow from the secondary inlet to the outdoor outlet, wherein the secondary outlet is fluidly coupled to the third outlet duct of the refrigerant switchover valve via a secondary duct;

a hydronic heating system comprising a hydronic heat exchanger and a hydronic pump, wherein the hydronic heat exchanger is disposed of in the storage tank, wherein the hydronic heat exchanger is configured to facilitate the transfer of the heat between the hydronic fluid and the water stored in the storage tank, wherein the hydronic pump is configured to circulate a hydronic fluid (water) between the hydronic heat exchanger and an external heat exchanger; and an indoor unit comprising an indoor heat exchanger configured to facilitate the transfer of the heat between the fluid and an indoor environment, wherein the indoor heat exchanger comprises an indoor inlet and an indoor outlet, wherein the indoor inlet is fluidly coupled to the outdoor outlet of the outdoor heat exchanger and the secondary inlet of the secondary heat exchanger via a first indoor duct, wherein the indoor inlet is configured to facilitate the at least one of the fluid flow from the indoor inlet to the outdoor outlet and secondary inlet, and the fluid flow from the outdoor outlet and secondary inlet to the indoor inlet, wherein the indoor outlet is fluidly coupled to the third outlet duct of the refrigerant switchover valve and the secondary outlet of the secondary heat exchanger via a second indoor duct, wherein the indoor outlet is configured to facilitate at least one of the fluid flow from the indoor outlet to the third outlet duct and secondary outlet and the fluid flow from the third outlet duct and secondary outlet to the indoor outlet, wherein the heat transfer system with the heat pump is further configured to initiate sequences of a new heating, cooling, and hot-water thermodynamic cycle by means of a smart control system.

2. The heat transfer system of claim 1, wherein the compressor is configured to pump a low-pressure refrigerant to a high-pressure side of the heat transfer system, thereby transforming the low-pressure refrigerant into a high-pressure refrigerant.

3. The heat transfer system of claim 1, wherein the outdoor heat exchanger and the indoor heat exchanger function as a condenser and an evaporator, wherein the outdoor heat exchanger and the indoor heat exchanger are refrigerant to air heat exchanger.

4. The heat transfer system of claim 1, wherein the outdoor heat exchanger and the indoor heat exchanger are configured to condense the refrigerant to release the heat of the refrigerant into the surrounding air and condensing the refrigerant into a liquid.

5. The heat transfer system of claim 1, wherein the outdoor heat exchanger and the indoor heat exchanger are further configured to vaporize the refrigerant to raise the temperature and pressure of the refrigerant to absorb the heat from the surrounding air.

6. The heat transfer system of claim 1 further comprising an auxiliary heating element configured to facilitate the heating of the indoor environment.

7. The heat transfer system of claim 1 further comprising a one direction thermostatic expansion valve (TXV) fluidly coupled with the outdoor outlet of the outdoor heat exchanger, the indoor inlet of the indoor heat exchanger, and the secondary inlet of the secondary heat exchanger, wherein the one direction thermostatic expansion valve is configured to facilitate the fluid flow in the outdoor duct and the first indoor duct.

8. The heat transfer system of claim 7 further comprising a liquid receiver disposed on the outdoor duct between the one direction thermostatic expansion valve and the secondary inlet of the secondary heat exchanger, wherein the liquid receiver is configured for receiving the fluid from the outdoor duct and transmitting the fluid to the secondary inlet.

9. The heat transfer system of claim 1 further comprising a water circulation pump disposed on the third outlet duct, wherein the water circulation pump is configured for circulating the fluid through the third outlet duct.

10. The heat transfer system of claim 1 further comprising one or more solenoid valves configured to shut-off or release of a refrigerant flow in the heat transfer system to manage the fluid flow.

11. The heat transfer system of claim 1, wherein the refrigerant comprises one of R410, R744, R404a, and R407C.

12. The heat transfer system of claim 1 further comprising one or more blower fan, wherein the one or more blower fan comprises an outdoor blower fan and an indoor blower fan, wherein the outdoor blower fan is configured to facilitate the transfer of the heat between the fluid in the outdoor heat exchanger and the outdoor environment and an indoor blower fan, wherein the indoor blower fan is configured to facilitate the transfer of the heat between the fluid in the indoor and the indoor environment.

13. The heat transfer system of claim 1 further comprising one or more temperature sensors, a processing device, a communication device, and a storage device, wherein the one or more temperature sensors is configured to generate a temperature data comprising a temperature of the water stored in the storage tank, a temperature of the outdoor environment, and a temperature of the indoor environment, wherein the storage device is configured to retrieve electricity price data, wherein the processing device is configured to analyze the temperature data and the electricity price data to generate a notification for a user, wherein the communication device is configured to transfer the notification to a user device associated with the user.

14. The heat transfer system of claim 1, wherein the heat transfer system utilizes one or more heating and cooling cycle configured to facilitate the transfer of heat of the fluid flowing to air and water using the heat pump.

15. The heat transfer system of claim 1 further comprising one or more electrically operable components, wherein the one or more electrically operable components comprises security systems, lighting systems, and information systems.

16. The heat transfer system of claim 1, wherein the hydronic heat exchanger comprises one of a water to water heat exchanger and a glycol to water heat exchanger.

* * * * *